Dec. 2, 1958  A. K. LITTWIN ET AL  2,862,601
ELECTROMAGNETIC TRANSFER APPARATUS
Filed March 7, 1956  2 Sheets-Sheet 1

INVENTORS
Arthur K. Littwin
Donald F. Littwin
BY Sheridan, Davis & Cargill
Attorneys

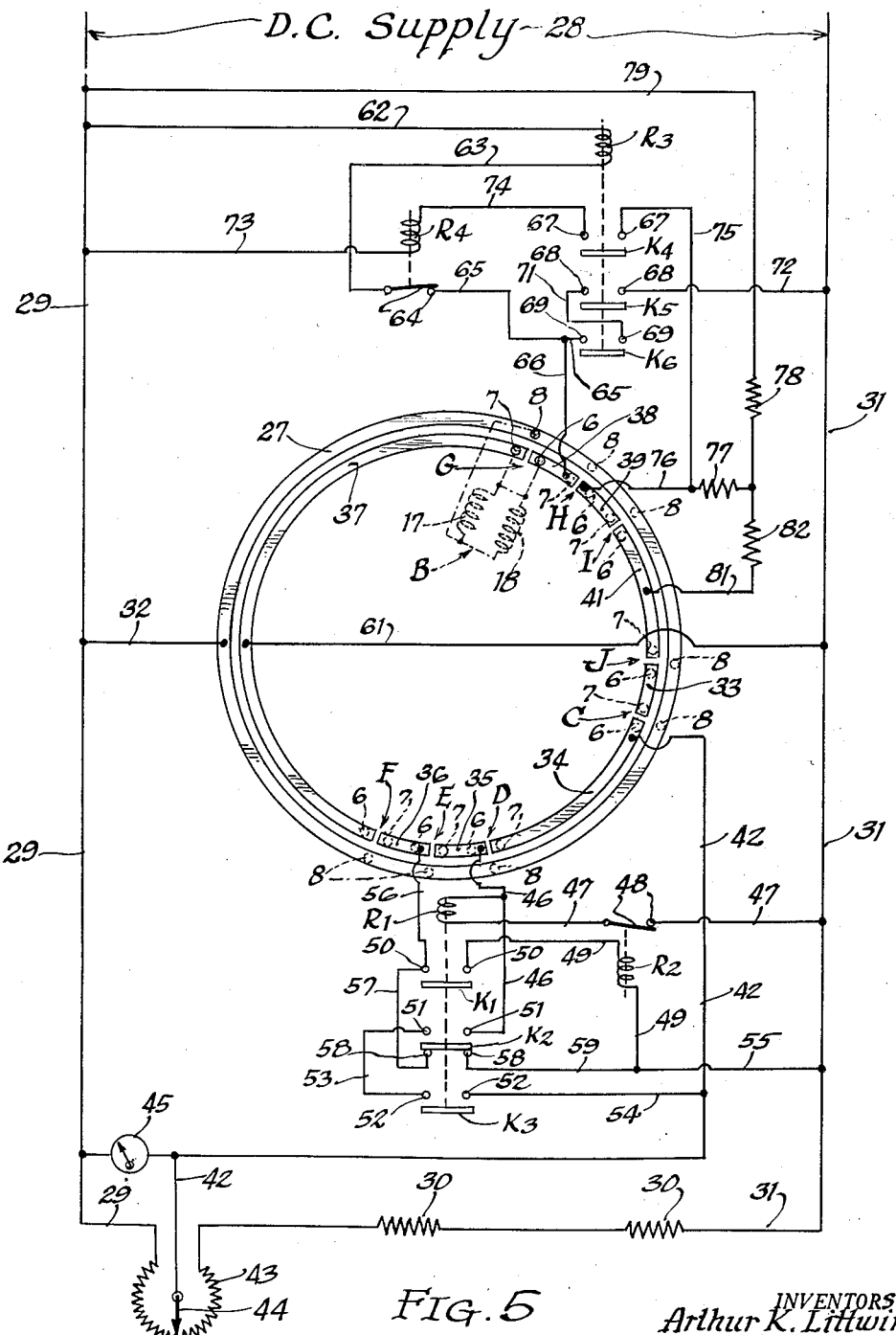

United States Patent Office 2,862,601
Patented Dec. 2, 1958

2,862,601

ELECTROMAGNETIC TRANSFER APPARATUS

Arthur K. Littwin, Lincolnwood, and Donald F. Littwin, Chicago, Ill., assignors, by mesne assignments, to Robert L. Littwin, Arthur K. Littwin, and Louis W. Bier, Chicago, Ill., as trustees Application March 7, 1956, Serial No. 570,173

24 Claims. (Cl. 198—25)

This invention relates in general to a transfer apparatus and method and has more particular reference to such an apparatus for, and method of, transferring a plurality of articles "seriatim" from one position to another, whereby they may be worked on or treated during or after the transfer.

An object of the invention is to provide an electromagnetic article transfer apparatus that will operate efficiently over a long period of use.

Another object of the invention is to provide an electromagnetic transfer apparatus that will operate with a high degree of accuracy and efficiency even after a long period of use.

Still another object of the invention is the provision of a control circuit for a rotating electromagnetic transfer apparatus that effects efficient and accurate operation of the transfer apparatus even after long and continuous use of the transfer apparatus with a minimum of maintenance and loss of operating time.

A further object of the invention is to provide an electromagnet that can produce magnetic fields of various predetermined intensities accurately during a relatively short period of time.

A further object of the invention is the provision of a rotatable electromagnet that can produce magnetic fields of various predetermined intensities with a minimum of arcing.

A further object of the invention is to provide an article transfer apparatus for holding an article during transfer thereof and releasing the article with a minimum of wear on the components of the apparatus and the article.

Another object of the invention is the provision of an article transfer apparatus for transferring a plurality of articles from a given position and accurately positioning the articles in another predetermined position.

A still further object of the invention is to provide an electrical control circuit for supplying different voltages to a movable conductor at predetermined positions with a minimum of arcing on the movable conductor.

A still further object of the invention is the provision of a rotatable electromagnet having an electrical control circuit for removing or changing the voltage applied to said electromagnet at predetermined positions with a minimum of arcing.

A further object of the invention is to provide a method of transferring an article with a minimum of wear to said article.

A still further object of the invention is the provision of a method for accurately and continuously transferring a plurality of articles from one predetermined position to another predetermined position.

Numerous other objects and advantages of the invention will be apparent as it is better understood from the following description, which, when taken in connection with the accompanying drawings, discloses a preferred embodiment thereof.

In the drawing:

Fig. 5 is a schematic wiring diagram of the control circuit of the article transfer apparatus.

Figure 1:
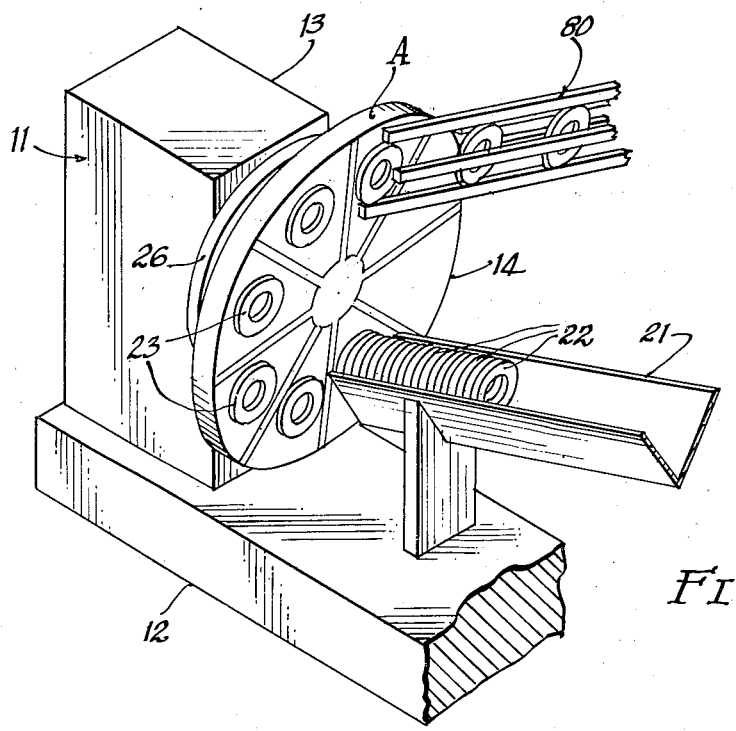
Figure 1 is an isometric view of the rotary article transfer apparatus embodying the features of the invention.

In the present invention a plurality of magnetic articles or work pieces supported by a V-shaped supporting tray, are fed by gravity or other suitable means toward and into cooperative relationship with the lower portion of a rotatable article supporting plate A. The article supporting plate has mounted thereon, a plurality of electrical coil means which comprise electrical windings B and brushes which are electrically connected thereto. The electrical windings B cooperate with the plate to provide electromagnet means for attracting the lowermost article from the tray and magnetically attaching it to the rotatable plate A. The initial magnetic force exerted by the windings B, as they rotate with the plate past the adjacent end of the tray, for loading the articles onto the rotatable plate A is relatively low, thereby preventing damage to the articles and also the supporting tray and facilitating separating the leading article from the other article or articles in the tray. To accomplish these results for various sizes of articles, this relatively low magnetic force for loading the articles on the rotatable plate A, may be adjusted for optimum loading conditions dependent on the characteristics of the article. After an article has been loaded on the rotatable plate A it will rotate with the plate A due to the magnetic force of the windings B. Shortly after the initial loading of an article on the plate A the magnetic force of the coils B is increased to a relatively high magnitude until the articles or work pieces contact an unloading ramp at which time the voltage imposed across coils B is cut off, thereby effecting release of the article from the rotating plate A and forcing them through a generally horizontally disposed unloading ramp.

For accomplishing the above results efficiently and accurately the windings B are electrically connected to spring pressed brushes which slide, during the rotary movement of plate A, on a series of fixed conductors. The positioning of these brushes relative to the fixed conductors is indicated by letters C through J as shown in Fig. 5 of the drawing. When position C is reached by the brushes a relatively low voltage is imposed across the windings B for producing an initial relatively low magnetic force to thereby load the articles onto the rotatable plate A. This relatively low voltage continues to be imposed across the windings B until position E is reached by the coil brushes. At this point a relatively high voltage is imposed across the windings B in such a way that arcing between the brushes and the conductors will not occur due to this change in voltage. The relatively high voltage continues to be imposed across the windings B until the brushes reach a position indicated by H in the drawing. At this time the voltage imposed across the windings B is completely removed and in such a way that arcing will not occur between the brushes and the conductors due to the removal of this relatively high voltage.

In a conventional electromagnet the voltage across the magnetic windings or coils is removed by the coil brush moving beyond and out of contact with a fixed conductor thereby opening the circuit. As a result of this circuit opening, harmful arcing occurs between the coil brush and the fixed conductor as the coil brush leaves the conductor. After a short period of time such arcing requires that the coil brushes and conductors be replaced. The replacement of these elements is expensive and time consuming and often interrupts a whole production line for a considerable time. In order to replace the coil brushes and the conductors the article or work supporting plate must be removed. For the size of electromagnet required in a typical production line these plates weigh from 400 to 2000 pounds and are up to 6 feet in diameter. Consequently, the manipulation of these plates is quite time consuming and expensive, as is the actual replacement of the conductors and coil brushes. As a result, the use of the conventional rotating electromagnet is wholly impractical for many production lines.

In the present invention, however, arcing between the coil brushes and the fixed conductors, due to the change in voltage across the electromagnetic coils or windings, is eliminated. The arcing that does occur in the present invention due to a voltage change is substantially decreased. Further, this arcing occurs in relay contacts which can be quickly replaced at a relatively small expense, thereby making rotary electromagnets, of any size, available for use in production lines wherein they were heretofore impractical.

A further common fault of conventional rotary electromagnets is that when the voltage imposed across the windings or coils is removed an induced voltage is effected which results in unsatisfactory unloading of the object from the electromagnet and considerable arcing at the brushes. In the present invention, however, as the coil brushes rotate clockwise from position H to position J, this induced voltage or any remaining voltage is dissipated, thus effecting efficient removal of the article from the rotating plate A with a minimum of arcing between the brushes and fixed conductors. The coils B and the coil brushes continue to rotate clockwise until they reach position C, at which time a relatively low voltage is again imposed across the coils B and the electromagnetic cycle is again repeated as described above.

Figures 2, 3, 4:
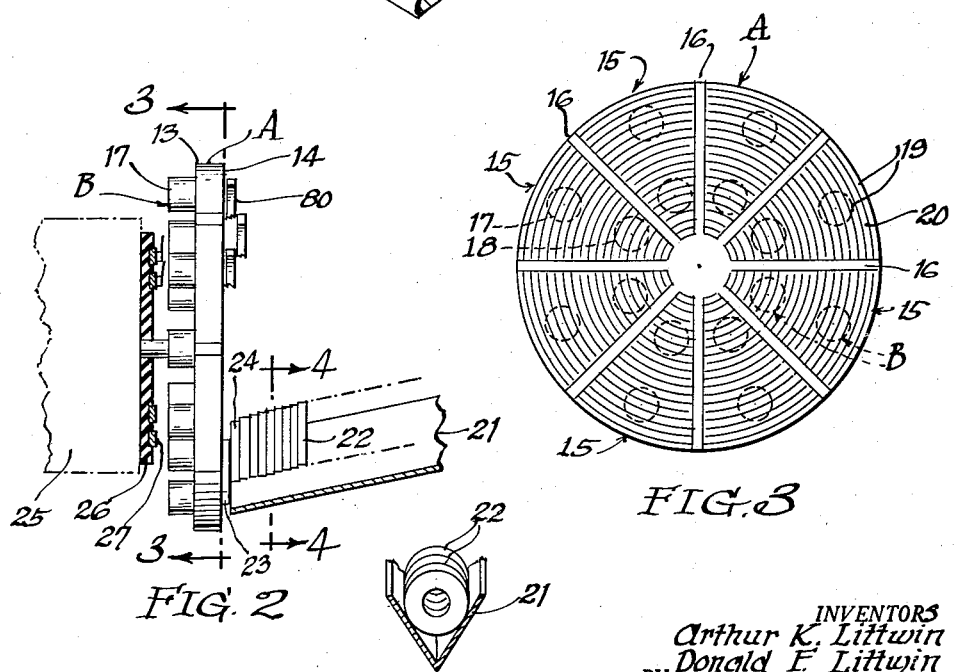
Fig. 2 is a side elevational view of the article transfer apparatus.
Fig. 3 is a front elevational view of the article transfer apparatus taken on lines 3—3 of Fig. 2.
Fig. 4 is a cross-sectional view taken through lines 4—4 of Fig. 2.

As shown in Fig. 1, numeral 11 indicates generally a supporting structure having a base 12 and a vertical housing structure 13. Rotatably mounted on the housing structure 13 is a circular article supporting plate A. As shown in Fig. 3, the article supporting plate A is of the type having a plurality of pie-shaped sections 15 with magnetic insulating strips 16 between each two adjacent pie-shaped sections 15. Secured to the article supporting plate A on the rear side thereof and associated with each pie section 15 are electrical coil means comprising windings B and associated brushes. The windings B comprise two electromagnetic coils 17 and 18 as shown in Figs. 2 and 3. Each pie-shaped section 15 is made up of alternate magnetic and non-magnetic circular segments 19 and 20. The electromagnetic coils 17 and 18 are oppositely wound and electrically connected in parallel. Hence, when a voltage is imposed across the electromagnetic coils 17 and 18, they cooperate with the associated pie section 15 to provide an electromagnet means.

A V-shaped supporting tray 21 supports a plurality of articles or work pieces 22. The articles 22 are fed downwardly towards the article supporting plate A by gravity or some other suitable drive mechanism. In the drawing, metallic rings are illustrated as the objects to be transferred by the article transfer apparatus. The tray 21 is positioned relative to the supporting plate A so that as the plate A rotates, the lowermost ring 23 will be attracted by a relatively low magnetic force, towards one of the pie sections 15. Further rotation of the plate A will separate the lowermost ring 23 from the stack of similar rings 22 since the tray 21 is spaced horizontally from the rotating plate A a distance slightly greater than the thickness of one of the rings 22. This distance can be varied to accommodate articles of various sizes. Since the electromagnetic force employed to initially attract the ring 23 onto the plate A is a relatively low magnetic force, the stripping action for removing the ring 23 from the column of rings 22 will not damage the tray 21, the lowest ring 23 or the next lowest ring 24. This initial relatively low magnetic field can be varied to accomplish this result for various types and sizes of articles 22.

The article supporting plate A is mounted for rotation on the vertical housing structure 13. Located within the housing structure 13 is a motor 25 or some other suitable means for rotating the article supporting plate A. Mounted on the vertical housing structure 13 and in fixed relation therewith is an insulating member 26. Member 26 is employed to mount a plurality of circularly shaped fixed conductors for imposing various voltages across the windings B. Mounted on the article supporting plate A and spring pressed for sliding physical and electric contact with these conductors are three brushes 6, 7, and 8. These brushes are solid metallic conductors, and will hereinafter be referred to as coil brushes. As shown in Fig. 5, the coils 17 and 18 are wound in opposite directions and are electrically connected in parallel, having one end thereof electrically connected to an outer coil brush 8 and the other end electrically connected to a forward coil brush 6 and a rearward coil brush 7. The coils 17 and 18 have a resistance of approximately 380 ohms each, thus effecting a total resistance of 190 ohms. As the article supporting plate A rotates clockwise, the spring pressed coil brush 8 will be in continual physical and electrical contact with an outer circular conductor ring 27 that is mounted on insulating member 26. The spaced apart coil brushes 6 and 7 are spring pressed for physical and electrical contact with a series of spaced circularly shaped conductors that will hereinafter be described.

A suitable direct current voltage source 28 is employed and electrically connected to power conductors 29 and 31, as shown in Fig. 5. The outer conductor ring 27 is electrically connected to the conductor 29 through a conductor 32. Since the spring pressed coil brush 8 is in constant contact with the fixed conductor ring 27, one side of the windings B will be in constant electrical contact with the one side of the direct current source 28 throughout the electromagnetic cycle caused by the rotation of plate A.

During the clockwise rotation of plate A, the coil brushes 6 and 7 will contact a plurality of circular spaced conductors that are mounted in fixed relation to the insulating member 26 and within the circular conductor ring 27. These conductors are rectangular in cross section and are uniformly spaced from each other by some suitable insulating material or by air acting as an insulator. The coil brushes 6 and 7 are mounted on the supporting plate A and are spring pressed toward these inner fixed conductors. Further, the coil brushes 6 and 7 are spaced apart a distance substantially greater than the distance between the spaced inner conductors so that as the forward coil brush 6 comes into full contact with one conductor the rearward coil brush 7 is still sliding on the preceding conductor. The action of these brushes will result in voltages of various sizes being imposed across each pair of windings B so that the windings B will effect magnetic fields of various intensities.

As the electromagnetic cycle commences the coil brushes 6 and 7 are located on a neutral conductor 33. Conductor 33 has no electrical connection, therefore there will be no voltage imposed across the windings B. When the coil brushes reach position C, forward coil brush 6 contacts a low voltage conductor 34. At this instant a relatively low voltage is imposed across the windings B, for loading the articles 22 onto the supporting plate A, due to the connection of conductor 34 to a rheostat 43 through conductor 42. Rheostat 43 has a resistance of 100 ohms and is electrically connected to power conductor 29 on one side and to power conductor 31 on the other side through two 20 ohm current limiting resistors 30. The voltage imposed across the windings B by this low voltage circuit can be varied, for different articles, by changing the setting of variable contactor 44 on rheostat 43. Voltmeter 45 indicates the relatively low voltage employed. Thus, when the optimum relatively low voltage is determined for loading a particular article, the apparatus may be subsequently reset to thereby again employ this optimum low voltage. Such a voltage would be one that would effect accurate loading of an article onto the rotating plate A without damage to the articles 22 or the article supporting tray 21.

As the coil brushes continue their clockwise rotation rearward coil brush 7 will leave the neutral conductor 33. Since conductor 33 has no electrical connections there will be no arcing as rearward coil brush 7 leaves neutral conductor 33. As the coil brushes rotate clockwise in sliding contact with low voltage conductor 34 the relatively low loading voltage continues to be imposed across the windings B. As the rotation continues forward to the position shown by D in the drawing, coil brush 6 contacts an intermediate step up conductor 35. This action completes a circuit through coil brush 8, windings B, coil brush 6, intermediate step up conductor 35, conductor 46, an intermediate step up relay R1, contacts 48, and conductor 47 that is connected to power conductor 31. When this circuit is completed, intermediate step up relay R1 is actuated and contact bars K1, K2, and K3 are picked up, closing contacts 50, 51 and 52, respectively. In so doing, another low voltage circuit is completed wherein the intermediate step up conductor 35 assumes the same potential as the low voltage conductor 34 while rearward coil brush 7 is still in contact with low voltage conductor 34. This is done by a circuit formed through windings B, intermediate step up conductor 35, conductor 46, contacts 51 and contact bar K2, conductor 53, contacts 52 and contact bar K3, and then conductor 54 that is connected to conductor 42. Thus, as the rearward coil brush 7 leaves the low voltage conductor 34, arcing will be minimized since the intermediate step up conductor 35, and therefore the coil brush 7, is at the same potential as the low voltage conductor 34 since both conductors 34 and 35 are connected to conductor 42. Further, when the forward coil brush 6 initially contacts the intermediate step up conductor 35, there will be no arcing since the resistance of the intermediate step down conductor R1 is approximately 800 ohms as are all other relays in this present invention and further this is a "circuit closing" action rather than a "circuit opening" action. Thus, as the coil brushes continue their rotation in sliding contact with the intermediate step up conductor 35, the relatively low loading voltage continues to be imposed across the windings B.

As the coil brushes continue their clockwise rotation, the forward coil brush 6 comes into contact with a step up conductor 36, while the rearward coil brush 7 is still in sliding physical and electrical contact with the intermediate step up conductor 35. This position indicated by E in the drawing actuates a step up relay R2. Step up relay R2 is actuated by virtue of a circuit closed through conductor ring 27, windings B, forward coil brush 6, step up conductor 36, conductor 56, contacts 50 and contact bar K1, conductor 49, through step up relay R2 and conductor 55 to power conductor 31. The initial contact between forward coil brush 6 and the step up conductor 36 will not produce any arcing since this is a "circuit closing" action, and also due to the high resistance of step up relay R2. When the step up relay R2 is actuated the contacts 48 are picked up, thus opening conductor 47 to thereby deactivate the intermediate step up relay R1. As the intermediate step up relay R1 is deactivated, the contact bars K1, K2 and K3 are dropped. When contact bar K1 is dropped it opens contacts 50, thereby deactivating the step up relay R2 and dropping or closing the contact 48. This action conditions the circuit so that the next succeeding set of coil brushes will effect the above described actuation of intermediate step up relay R1 and subsequently the actuation of step up relay R2. When the contact bars K2 and K3 are dropped they open contacts 51 and 52, thereby opening the circuit that supplied a low voltage across the windings B through step up conductor 35. This is done while the rearward coil brush 7 is in sliding contact with the intermediate step up conductor 35. Further, the dropping of contact bar K2 closes the back contacts 58, to complete a high voltage circuit that connects the step up conductor 36 with the power conductor 31 through conductor 56, conductor 57, contacts 58 and contact bar K2, conductor 59, and conductor 55. Hence, by the dropping of contact bar K2, contacts 58 are closed and a high voltage is imposed across the windings B, through conductor 36, so that they may produce a relatively high magnetic force.

Thus, it is seen that when the coil brushes reach the position shown by E in the drawing the low voltage applied to the windings B through the intermediate step up conductor 35 is removed by dropping contact bars K2 and K3, thereby opening this low voltage circuit. Further, the step up conductor 36 is connected directly to the power conductor 31, whereas the connection between the intermediate step up conductor 35 and power conductor 31 is either opened at contacts 48 or is made through the high resistance of relay R1. If either of these conditions exists, no current will flow through intermediate step up conductor 35. Thus, any arcing resulting from removing the low voltage applied to the windings B through the intermediate step up conductor 35 will occur in contacts 51 and 52, which open the circuit supplying the low voltage rather than at the coil brushes since the rearward coil brush 7 is still in physical and electrical sliding contact with intermediate step up conductor 35 when this circuit opening occurs. The contacts 50, 51, and 52, contact bars K1, K2, and K3 and the associated intermediate step up relay R1 are conveniently located in the housing structure 13 in the rear of the apparatus so that replacement of these relay contacts can be accomplished in a very short period of time and with a minimum of expense and delay of production. Since, however, this arcing occurs at four points, that is contacts 51 and 52, and with terminals K2 and K3, the deterioration or migration of the individual contacts due to arcing will be quite small and replacement will only be required after a relatively long period of time. Thus as the rearward coil brush 7 leaves the intermediate step up conductor 35 no current will flow from rearward coil brush 7 through step up conductor 35 due to the opened contacts 48 or the resistance of relay R1. Hence conductors 35 and 36 and the coil brushes 6 and 7 will be at the same electrical potential as rearward coil brush 7 leaves the intermediate step up conductor 35 and consequently no arcing will occur.

As stated above, as the coil brushes rotate beyond the position shown by E in the drawing and the rearward coil brush 7 leaves the intermediate step up conductor 35 no arcing will occur since no current will flow between the step up conductor 36 and the intermediate step up conductor 35 and hence they are maintained at the same potential. Further, no arcing will occur when the forward brush 6 contacts the step up conductor 36 due to the relatively high resistance of the step up relay R2 and further since this action is one of closing a circuit rather than opening it. As the coil brushes continue their clockwise rotation from position E in the drawing, a relatively high voltage will be imposed across the windings B thereby effecting a relatively high magnetic force so that the article will be strongly held or gripped by the electromagnet. This relatively high voltage imposed across the windings B continues to be applied through positions F and G and until the position H shown in the drawing is reached so that during this period the article is firmly and accurately positioned or held during this relatively long length of travel.

To provide for this action a high voltage conductor 37 is employed. This conductor as shown in Fig. 5 of the drawing is circular in shape and is spaced from the step up conductor 36 by an electrical insulating means or merely by air acting as an electrical insulating means. The high voltage conductor 37 is electrically connected to the power conductor 31 through conductor 61. Thus, as the coil brushes 6 and 7 move clockwise from position E in the drawing, to position F, onto the high voltage conductor 37, arcing will be minimized since the step up conductor 36, coil brush 7 and the high voltage conductor 37 are maintained at the same potential, thereby preventing any current flow since both conductors 36 and 37 are electrically connected to the power conductor 31. Thus the change from a relatively low voltage to a relatively high voltage imposed across the pair of windings B, has been made with a minimum of arcing occurring between the continually rotating coil brushes and the fixed conductors which are necessarily positioned or located behind the heavy supporting plate A.

As the coil brushes proceed in a clockwise manner to position G in the drawing, the forward coil brush 6 will contact an intermediate step down conductor 38 while the rearward coil brush 7 is still in contact with the high voltage conductor 37. At this time while the rearward coil brush 7 is still in contact with the high voltage conductor 37, an intermediate step down relay R3 will be actuated by current flowing through power conductor 29, conductor 62, intermediate step down relay R3, conductor 63, contacts 64, conductor 65, conductor 66, intermediate step down conductor 38, forward coil brush 6, rearward coil brush 7, high voltage conductor 37, to power conductor 31. No arcing will occur by forward coil brush 6 coming into contact with the intermediate step up conductor 38 since this is a circuit closing action as contrasted to a circuit opening action, and, further, because the intermediate step down relay R3 has a relatively high resistance compared to the resistance of the windings B. When the intermediate step down relay R3 is actuated by this action, the contact bars K4, K5 and K6 will be picked up, closing contacts 67, 68 and 69, respectively. When contact bars K5 and K6 are picked up closing contacts 68 and 69 the intermediate step down conductor 38 is given the same potential as the high voltage conductor 37 by virtue of the circuit closed through conductor 66, conductor 65, contacts 69, and contact bar K6, conductor 71, contacts 68, and contact bar K5, and conductor 72 which is connected to the power conductor 31. This also provides a circuit to keep relay R3 actuated through contacts 69 and 68 and conductor 72. Thus by this action, both the high voltage conductor 37 and the intermediate step down conductor 38 are electrically connected to the power conductor 31. As a result of this, as the coil brushes 6 and 7 continue their clockwise rotation from the position G in the drawing, there will be no arcing as the rearward coil brush 7 leaves the high voltage conductor 37 since it is maintained at the same potential as the conductor 37 through intermediate step down conductor 38. Thus as the coil brushes 6 and 7 continue their rotation in sliding contact with the intermediate step down conductor 38 a relatively high voltage continues to be imposed across the windings B.

When the position of the coil brushes reaches that indicated by H in the drawing, the forward coil brush 6 comes into contact with a step down conductor 39. This conductor like all the other fixed conductors is arcuate in shape and spaced from the other conductors either by air or by some electrical insulating material. When the forward coil brush 6 contacts the step down conductor 39, a step down relay R4 is actuated by current flowing through power conductor 29, conductor 73, step down relay R4, conductor 74, contacts 67 and contact bar K4, conductor 75, conductor 76, forward coil brush 6, rearward coil brush 7 and intermediate step up conductor 38 which is electrically connected to power conductor 31 as previously described. When the step down relay R4 is actuated the contacts 64 are picked up, thereby deactivating the intermediate step down relay R3. As a result of this, the contact bars K4, K5, and K6 are dropped opening contacts 67, 68 and 69, respectively. When contacts 68 and 69 open they open the electrical connection of intermediate step down conductor 38 with the power conductor 31. The step down conductor 39 is electrically connected to the high voltage conductor 29 through conductor 76, resistors 77 and 78, whose purpose will be explained later, and conductor 79. Thus, by this action the circuit imposing the relatively high voltage across the windings B is opened to thereby release an article from the supporting plate A. Hence at this time the only current flow possible between coil brush 7 and conductor 38 would be current resulting from an induced voltage. The connection between conductor 38 and power conductor 29 however is either opened at contacts 64 or through the resistance of relay R3 which is high compared to the resistance of resistors 77 and 78. In either case current flow between coil brush 7 and conductor 38 caused by an induced voltage will be minimized and conductor 38 will assume the same voltage as the coil brush 7.

Thus the effect of the dropping of contact bars K5 and K6 is to open the high voltage circuit that has been applying a relatively high voltage across the windings B through intermediate step down conductor 38. The effect of this is to stop current flow through the windings B and thereby cut off the magnetic force caused by the windings B for release of the article from the article supporting plate A. This action all takes place while the rearward coil brush 7 is in sliding contact with the intermediate step down conductor 38. Therefore any arcing that occurs due to the opening of this high voltage circuit will occur not between the coil brushes and the fixed conductor, but will occur between the contact bars K5 and K6 and the contacts 68 and 69, respectively. These contact bars will take any arcing due to the opening of this high voltage circuit at four points rather than at one point as happens in the conventional rotary electromagnet. Consequently, the wear due to arcing will be reduced to a minimum. Further, these contact bars are conveniently located and their replacement can be accomplished quickly and far less expensively than the replacement of the coil brushes and the ring conductors. This action, of course, is contrasted to the conventional rotary electromagnet which lowers the voltage imposed across the windings solely by the coil brush leaving a fixed conductor to thereby open the high voltage circuit at that point. This, of course, results in arcing between the fixed conductor and the coil brush at that point, requiring that the coil brushes and the fixed conductors be replaced frequently requiring considerable time and expense.

When the intermediate step down relay R3 is deactivated by the actuation of step down relay R4, the contact bar K4 also drops simultaneously with the dropping of contact bars K5 and K6. This action deactivates the step down relay R4 thereby dropping contacts 64 so that the circuit involving intermediate step down relay R3 may be conditioned to respond to the coil brushes of the next succeeding electrical windings.

As the coil brushes 6 and 7 rotate clockwise beyond the position indicated by H in the drawings, the rearward coil brush 7 will leave the intermediate step down conductor 38. The arcing from this action will be at a minimum since, as explained above, the current between the coil brush 7 and the conductor 38 is at a minimum. Thus, as the rearward coil brush 7 leaves the intermediate step down conductor 38, it is at the same potential as the intermediate step down conductor 38. Therefore, only a minimum of arcing will occur.

After the sudden decrease in voltage across the windings B, an induced voltage will be set up in the windings B. In the conventional rotary electromagnet, this induced voltage results in arcing and less efficient unloading of the article from the electromagnet. In the present invention, however, as the coil brushes 6 and 7 ride on the step down conductor 39, this induced voltage is dissipated over resistors 77 and 78. This is possible since both sides of the windings B are electrically connected to the power conductor 29 thereby establishing a dissipating circuit. Coil brush 8 is electrically connected to power conductor 29 through the high voltage conductor 27 and conductor 32, whereas coil brushes 6 and 7 are electrically connected to the power conductor 29 through the step down conductor 39, conductor 76, resistors 77 and 78, and conductor 79. Thus, as the coil brushes 6 and 7 slide on the step down conductor 39, the induced voltage in the windings B is being dissipated over the resistors 77 and 78. These resistors are approximately 50 ohms each to obtain the maximum amount of dissipation for the time allotted to this portion of the electromagnetic cycle. At this time the article is being released from the plate A and forced through a horizontally disposed unloading ramp 80 that unloads the articles, by a stripping action, for movement in the same plane as a plane formed by plate A.

As the coil brushes continue their clockwise rotation, they will come to a position indicated by I in the drawing, wherein the forward coil brush 6 will contact a voltage dissipating conductor 41. This conductor, as the step down conductor 39, is also connected to the power conductor 29, through a conductor 81 and resistor 82. Consequently, the step down conductor 39 and the voltage dissipating conductor 41 will have the same potential at this time. Thus, as the rearward coil brush 7 leaves the step down conductor 39, there will be no arcing since the rearward coil brush 7 and the step down conductor 39 are at the same potential. As the coil brushes 6 and 7 continue to slide on the voltage dissipating conductor 41, the induced voltage in the windings B will continue to be dissipated by virtue of conductor 81, through resistor 82 and resistor 78, similarly as this voltage was dissipated through the resistors 77 and 78. Resistor 82 is also approximately 50 ohms to obtain the optimum amount of voltage dissipation during the time allotted in the electromagnetic cycle. Thus, the resistance in this voltage dissipating circuit will be approximately 100 ohms, while the coil brushes 6 and 7 travel over the step down conductor 39 and the voltage dissipating conductor 41. By dissipating the induced voltage in this manner while the coil brushes 6 and 7 are on the conductors 39 and 41, the article held by the windings B can be accurately and quickly released from the article supporting plate A with a minimum of stripping force and with a minimum of arcing at the brushes.

The windings B and the coil brushes 6, 7, and 8 continuing their clockwise rotation reach a position indicated by J in the drawing. In this position the forward coil brush 6 contacts the neutral conductor 33 which has no electrical connection. By the time the rearward coil brush leaves the voltage dissipating conductor 41, the above described induced voltage will be completely dissipated. Consequently, as the rearward coil brush 7 leaves the voltage dissipating conductor 41, there will be no arcing since there is no current flow in the above described voltage dissipating circuit. The windings B and the coil brushes 6, 7, and 8 will then continue their clockwise rotation and continue to repeat the above described electromagnetic cycle.

In the operation of the present invention as the coil brushes 6 and 7 rotate clockwise from position C in the drawing, a relatively low voltage is imposed across the windings B for accurately loading the lowermost article 23, shown in Fig. 2, onto the rotatable article supporting plate A. This relatively low voltage imposed across the windings B effects a relatively low magnetic force to thereby accurately and with a minimum of force load the article 23 onto the rotating plate A. This initial relatively low loading voltage can be adjusted by use of the rheostat 43, so that the optimum loading voltage may be obtained for any type of article transfer table A. As the article supporting plate A continues its clockwise rotation, the coil brushes reach a position indicated by D in the drawing. When the forward coil brush 6 contacts the intermediate step up conductor 35, the intermediate step up relay R1 is actuated, thereby picking up the contact bars K1, K2, and K3. This results in completing another low voltage circuit through conductors 46, 53, and 54, so that a relatively low voltage continues to be imposed across the windings B, as the coil brushes travel from the position D to the position E as indicated in the drawing. As the rearward coil brush 7 leaves the low voltage conductor 34, intermediate step up conductor 35 and low voltage conductor 34 are being maintained at the same potential. Therefore, rearward coil brush 7 is at the same potential as low voltage conductor 34 by virtue of its connection to the forward coil brush 6 that is sliding on the intermediate step up conductor 35. Hence, as coil brush 7 leaves low voltage conductor 34, arcing at this point will be at a minimum.

A relatively low voltage continues to be imposed across the windings B, for loading the lowermost article 23 onto the transfer plate A until the position E, as shown in the drawing, is reached. In this position the forward coil brush 6 contacts the step up conductor 36. In so doing, the step up relay R2 is actuated by virtue of conductor 56, contact bar K1, conductor 49, and conductor 55. The actuation of step up relay R2 opens contacts 48 thereby deactivating intermediate step up relay R1. The result of this action is to open the low voltage circuit supplying a relatively low voltage across the windings B through intermediate step up conductor 35, while the rearward coil brush 7 is still in sliding physical and electrical contact with the intermediate step up conductor 35. This is done by the opening of contacts 51 and 52 when the contact bars K2 and K3, respectively, are dropped. Further, by the dropping of contact bar K2, the back contacts 58 close a high voltage circuit that connects the step up conductor 36 with the power conductor 31 so as to impose a relatively high voltage across the windings B through conductor 36. The dropping of contact bar K1 deactivates the step up relay R2 so that the contact 48 will be closed thereby conditioning the circuit so that the intermediate step up relay R1 can be activated upon contact of the next succeeding forward brush with the intermediate step up conductor 35.

All of the above actions occur while the rearward brush 7 is still in sliding physical and electrical contact with the intermediate step up conductor 35 so that there will be no arcing between the brushes and the fixed conductor segments due to the opening of the circuit supplying a low voltage across the windings B. If any arcing does occur, it will be at the four points of the contacts 51 and 52, which can be conveniently located for easy replacement. After the above actions occur there will be no current flow from the rearward coil brush 7 to the intermediate step up conductor 35 since the electrical connection of the intermediate step up conductor 35 with the power conductor 31 is either opened at contacts 48 or is made through the relatively high resistance of relay R1, whereas the step up conductor 36 has a direct electrical connection through conductors 56, 57, contacts 58, conductor 59 and conductor 55, with the power conductor 31, thus offering a path of no resistance to the power conductor 31. Consequently, as the coil brush 7 leaves the intermediate step up conductor 35, as the supporting plate A and the windings B rotate clockwise, there will be no arcing between the rearward coil brush 7 and the intermediate step up conductor 35 and these two elements will assume the same potential during this time. Thus it is seen that in the present invention by changing the voltage imposed across the electromagnetic windings from a first to a second voltage, while a coil brush is in sliding physical and electrical contact with a first conductor, there will be no arcing between the coil brush and the first conductor due to this change in voltage. Further, as the coil brush continues its rotation in sliding physical and electrical contact with a second conductor, the second conductor continues to impose the second voltage across the windings B, and there will be only a minimum of arcing as the coil brush leaves the first conductor, since the first conductor assumes the same potential as the coil brush. This, of course, is contrasted to the present rotating electromagnetic devices which change the voltage across the electromagnetic windings by virtue of a coil brush leaving a conductor, thereby breaking the electrical circuit at that time and necessarily causing substantial arcing between the brush and the conductor.

The relatively high voltage will be continued to be imposed across the windings B from the position indicated by E, F, and as the coil brushes 6 and 7 complete a high voltage circuit through the high voltage conductor 37. During this period the windings B will effect a relatively high magnetic attraction upon the articles, thereby providing for accurate placement of the articles on the rotating article supporting plate A.

When the coil brushes reach the position indicated by G, the intermediate step down relay R3 will be actuated by the current passing through power conductor 29, conductor 62, relay R3, conductor 63, contacts 64, conductor 65, conductor 66, coil brushes 6 and 7, and high voltage conductor 37 which is electrically connected to the power conductor 31. This action will complete a high voltage circuit that connects the intermediate step down conductor 38 with the power conductor 31 through contacts 69 and 68. The result will be to continue to impose the relatively high voltage across the windings B as the coil brushes 6 and 7 slide on the intermediate step down conductor 38. As the rearward coil brush 7 leaves the high voltage conductor 37, arcing will be minimized between these elements since they are at the same potential by virtue of the intermediate step down conductor 38 and the high voltage conductor 37 both being directly connected to the power conductor 31.

When the coil brushes reach the position indicated by H in the drawing, the step down relay R4 will be actuated through the contacts 67 and contact bar K4. This will open contacts 64 thereby deactivating intermediate step down relay R3 and dropping contact bars K4, K5, and K6. By dropping contact bars K5 and K6, while the rearward coil brush is still in sliding physical and electrical contact with the intermediate step down conductor 38, the high voltage circuit supplying the relatively high voltage across the windings B will be opened, thus releasing the article from the electromagnetic hold of the windings B. Since this action occurs while the rearward coil brush 7 is still in sliding contact with an intermediate step down conductor 38, arcing will be minimized between the coil brushes and the intermediate step down conductor 38 due to this drop or change in voltage across the windings B. Any substantial arcing that may occur due to the opening of the high voltage circuit imposing a voltage across the windings B, will occur at the contacts 68 and 69 which can be conveniently positioned for easy replacement. Thus as the coil brushes 6 and 7 continue clockwise rotation or travel beyond the position H, there will be no arcing between the rearward coil brush 7 and the intermediate step down conductor 38 because these two elements are maintained at the same potential. This, of course, is contrasted to the conventional rotary electromagnet which lowers the voltage across the electromagnetic windings due to the coil brushes leaving a conductor, thereby resulting in considerable arcing between these two elements.

As the coil brushes continue their rotation from position H to position J shown in the drawing, the induced voltage caused by the change in voltage across the windings B, will be dissipated across the resistors 77, 78, and 82. Further rotation of the article supporting plate A, will result in the above described electromagnetic cycle repeating itself and another article being transported on the article supporting plate A.

While we have shown and disclosed an embodiment of the invention for the purposes of illustration, it will be apparent that the principle of the invention can be utilized in modifications of the particular circuit disclosed.

We claim:

1. A magnetic article transfer apparatus comprising a rotatably mounted article transfer means for moving an article through a circular path, a first means adjacent the initial portion of said path for effecting a relatively weak magnetic force to transfer said article onto said transfer means, a second means adjacent the intermediate portion of said path for effecting a relatively strong magnetic force to hold said article on said transfer means during rotation thereof, and a third means adjacent the final portion of said path that eliminates any magnetic attraction between said article and said transfer means for releasing said article, said transfer means being operative for controlling said first and third means.

2. An electromagnetic article transfer apparatus comprising a rotatably mounted article transfer means having an electromagnet mounted thereon for moving an article through a path, said electromagnet including an electrical winding means, a low voltage circuit for imposing a relatively low voltage across said winding means for initially moving said article onto said transfer means, a high voltage circuit for imposing a relatively high voltage across said winding means during the intermediate portion of said path, and step down circuit means for removing the voltage imposed across said winding means during the final portion of said path, said transfer means being operative for controlling said low voltage circuit and step down circuit means, said high voltage circuit being constantly energized.

3. An electromagnetic article transfer apparatus comprising a movable carrier, an electromagnet mounted on the carrier including electrical winding means, an intermediate electrical conductor, a voltage step down conductor electrically connected to a relay, movable conductor means electrically connected to said winding means and mounted for movement in sliding contact with said intermediate conductor and said step down conductor respectively, said intermediate conductor connected to an electrical circuit when said movable conductor means is in electrical contact therewith during movement of said movable conductor means for imposing a voltage across said winding means, said relay actuated by contact of said movable conductor means with said step down conductor while said movable conductor means is in sliding contact with said intermediate conductor to thereby open said electrical circuit and reduce the voltage imposed across said winding means.

4. An electromagnetic article transfer apparatus as set forth in claim 3, wherein said step down conductor is electrically connected to a means for dissipating any remaining voltage in said winding means.

5. An electromagnetic article transfer apparatus comprising a carrier mounted for movement in a continuous path, an electromagnet mounted on the carrier including a rotatably mounted electrical winding means, a high voltage conductor, an intermediate step down conductor electrically connected to an intermediate step down relay, a step down conductor electrically connected to a step down relay, movable conductor means electrically connected to said winding means and mounted for movement for sliding contact with said high voltage conductor, said intermediate step down conductor and said step down conductor respectively, said high voltage conductor connected to an electrical circuit for imposing a voltage across said winding means when said movable conductor means is in sliding contact therewith, said intermediate step down relay energized upon electrical contact of said movable conductor means with said intermediate conductor to complete another electrical circuit for applying a voltage across said winding means while said movable conductor means is in sliding contact with said high voltage conductor, and said step down relay energized upon electrical contact of said movable conductor means with said step down conductor for removing the voltage applied across said winding means by said other circuit while said movable conductor means is in sliding contact with said intermediate step down conductor.

6. An electromagnetic article transfer apparatus as set forth in claim 5, wherein said step down conductor is electrically connected to a means for dissipating any remaining voltage in said winding means.

7. An electromagnetic article transfer apparatus as set forth in claim 5 having an intermediate step up conductor and a step up conductor, said movable conductor means mounted for movement for sliding contact with said high voltage conductor, said intermediate step down conductor, said step down conductor, said intermediate step up conductor, said step up conductor, and said high voltage conductor, respectively, and means actuated upon movement of said movable conductor means into contact with said step up conductor to effect changing the voltage on said intermediate step up conductor to assume the voltage applied to said step up conductor for raising the voltage imposed across said winding means while said conductor means is in sliding contact with said intermediate step up conductor.

8. An electromagnetic article transfer apparatus as set forth in claim 5 having a low voltage conductor, an intermediate step up conductor electrically connected to an intermediate step up relay, a step up conductor electrically connected to a step up relay, said movable conductor means mounted for movement for sliding contact with said high voltage conductor, said intermediate step down conductor, said step down conductor, said low voltage conductor, said intermediate step up conductor, said step up conductor, and said high voltage conductor, respectively, said low voltage conductor completing a low voltage circuit for imposing a relatively low voltage across said winding means when said movable conductor means is in contact therewith, said intermediate step up relay actuated upon movement of said movable conductor means into contact with said intermediate step up conductor while said movable conductor means is in sliding contact with said low voltage conductor to complete another low voltage circuit wherein the voltage on said intermediate step up conductor is maintained approximately equal to the voltage on said low voltage conductor so as to effect application of a relatively low voltage across said winding means through said intermediate step up conductor, said step up relay actuated upon movement of said movable conductor means into contact with said step up conductor, while said conductor means is in physical and electrical contact with said intermediate step up conductor, to open said other low voltage circuit and apply a relatively high voltage across said winding means through said step up conductor.

9. An electromagnetic article transfer apparatus comprising an electromagnet including a rotatably mounted electrical winding means, a movable conductor means in electrical contact with said winding means, said movable conductor means rotatably mounted for movement in sliding physical and electrical contact with a low voltage conductor, an intermediate step up conductor that is electrically connected to an intermediate step up relay, a step up conductor that is electrically connected to a step up relay, respectively, said low voltage conductor electrically connected to a source of relatively low voltage for imposing a relatively low voltage across said winding means when said movable conductor means is in sliding contact with said low voltage conductor, said intermediate step up relay actuated upon movement of said movable conductor means into electrical contact with said intermediate step up conductor while said conductor means is in sliding contact with said low voltage conductor, for applying a relatively low voltage across said winding means through said intermediate step up conductor, said step up relay being actuated upon movement of said conductor means into electrical contact with said step up conductor, while said conductor means is in sliding contact with said intermediate step up conductor, for removing the relatively low voltage imposed across said winding means through said intermediate step up conductor and imposing a relatively high voltage across said winding means through said step up conductor.

10. An electromagnetic article transfer apparatus as set forth in claim 9, wherein said movable conductor means is rotatably mounted for movement in sliding physical and electrical contact with said low voltage conductor, said intermediate step up conductor, said step up conductor, and a high voltage conductor, respectively, said high voltage conductor electrically connected to a source of high voltage for imposing a relatively high voltage across said winding means when said movable conductor means is in sliding contact therewith.

11. An article transfer apparatus comprising a rotatably mounted article transfer table for moving the article through a circular path, an electromagnet including an electrical winding means secured to said article transfer table, movable conductor means electrically connected to said winding means, a low voltage conductor means, a high voltage conductor means, and a voltage step down conductor means, said movable conductor means mounted for movement in sliding physical and electrical contact with said low voltage conductor means for applying a relatively low voltage across said winding means, said high voltage conductor means for applying a relatively high voltage across said winding means, and said step down conductor means for removing the voltage applied across said winding means.

12. An electromagnetic article transfer apparatus comprising a carrier having a linear article supporting surface and being mounted for movement of said surface in an endless path past a pick-up station and an unloading station, an electromagnet on said carrier for establishing magnetic holding attraction at said surface, circuit closing conductors extending along said path and engaged by the electromagnet for energizing the latter, one of the conductors including portions spaced apart and distributed along said path, and means for imposing potential across the conductors of respectively various values along said portions of the one conductor for energizing the electromagnet at the pick-up station and de-energizing it at the unloading station.

13. The apparatus set out in claim 12 in which means is provided for increasing the voltage imposed to a maximum after the electromagnet passes the pick-up station.

14. An electromagnetic article transfer apparatus comprising a carrier plate having an annular article supporting surface on one side and mounted for rotation about an axis perpendicular to said surface for moving said surface through an endless circular path past a pick-up station and an unloading station, an electromagnet on said plate for establishing a magnetic holding attraction at said surface, circuit closing conductors extending around said path and engaged by the electromagnet for energizing the latter, one of the conductors being segmented with segments spaced apart and distributed along the path, and means for imposing voltage across said conductors of respectively various values along said segments for energizing the electromagnet at the pick-up station and de-energizing it at the unloading station.

15. The apparatus set out in claim 14, including means for loading articles on the plate at the pick-up station including a chute for stacking articles therein and having a lower end adjacent the plate at the pick-up station but spaced therefrom a distance to enable an article picked up therefrom and held on the plate to be carried from the chute in the direction of movement of the plate in sliding relation to another such article thereabove in the chute.

16. The apparatus set out in claim 15, including means for increasing the voltage imposed on the electromagnet after the electromagnet and the article picked up and held by the plate as stated have passed the chute.

17. The apparatus of claim 14 including an unloading ramp at said discharge station and extending in a plane parallel with said article supporting surface of the plate and positioned to be engaged by the articles in response to rotation of the plate for stripping the articles from the plate.

18. The apparatus of claim 14, wherein the means for imposing voltages of various values is controlled by said plate according to the position of the latter.

19. An electromagnetic article transfer apparatus comprising a carrier plate having an annular article supporting surface on one side made up of a series of segments circumferentially disposed, the plate being mounted for rotation about an axis perpendicular to said surface for moving said surface through an endless circular path past a pick-up station and an unloading station, a series of electromagnets on said plate, one associated with each of said segments of the plate for establishing magnetic holding attraction thereat, circuit closing conductors extending around said path and engaged by the electromagnet for energizing the latter, one of the conductors including a plurality of segments spaced apart and distributed along the path, and means for imposing potential across said conductors of respectively various values along said segments and serially relative to the electromagnets for energizing each electromagnet at the pick-up station and de-energizing it at the unloading station.

20. An electromagnetic article transfer apparatus comprising a carrier plate having an annular article supporting surface on one side and mounted for rotation about an axis perpendicular to said surface for moving said surface through an endless circular path past a pick-up station and an unloading station, an electromagnet on said plate for establishing a magnetic holding attraction at said surface, circuit closing conductors extending around said path and engaged by the electromagnet for energizing the latter, one of the conductors being segmented with segments spaced apart and distributed along the path, said electromagnet having a pair of brush portions engaging the segmented conductor and being so spaced apart that a leading brush portion engages a segment before the following brush leaves the previous segment, and means controlled by the plate for imposing voltage across the conductors of respectively various values along said segments for energizing the electromagnet at the pick-up station and de-energizing it at the unloading station, the segments being respectively energized and de-energized while one of the brush portions is in engagement therewith.

21. An electromagnetic article transfer apparatus comprising a carrier plate having an annular article supporting surface on one side and mounted for rotation about an axis perpendicular to said surface for moving said surface through an endless circular path past a pick-up station and an unloading station, an electromagnet on said plate for establishing a magnetic holding attraction at said surface, circuit closing conductors extending around said path and engaged by the electromagnet for energizing the latter, one of the conductors being segmented with segments spaced apart and distributed along the path, said electromagnet having a pair of brush portions engaging the segmented conductor and being so spaced apart that a leading brush portion engages a segment before the following brush leaves the previous segment, means for imposing voltage across the conductors for energizing the electromagnet including relay means energized by the electromagnet engaging predetermined segments, said relay means being so controlled by the plate as to energize the electromagnet at the pick-up station and de-energize it at the unloading station.

22. An electromagnetic article transfer apparatus comprising a carrier plate having an annular article supporting surface on one side and mounted for rotation about an axis perpendicular to said surface for moving said surface through an endless circular path past a pick-up station and an unloading station, an electromagnet on said plate for establishing a magnetic holding attraction at said surface, circuit closing conductors extending around said path and engaged by the electromagnet for energizing the latter, one of the conductors being segmented with segments spaced apart and distributed along the path, the segments including a first neutral segment and a segment opposite thereto constantly energized and intermediate segments therebetween including a first group associated with the pick-up station and a second group opposite the first group associated with the unloading station, relay means for imposing voltage on and removing it from the said groups of segments selectively, said electromagnet having a pair of brush elements engaging the segmented conductor and being so relatively positioned that a leading brush element engages a segment before the following brush element leaves the previous segment, said brush element being operative for controlling said relays, the leading brush element when engaging a segment of a group controlling the relay means for energizing the segment and substantially coincidentally therewith de-energizing the previous segment of that group.

23. A method of transferring a magnetic article by a rotating carrier, comprising applying an article to the surface of the carrier, rotating the carrier, applying a relatively weak magnetic force to the carrier and thereby moving the article from the position at which it was applied to the carrier, thereafter increasing the magnetic force for holding the article on the carrier, and thereafter releasing the article from the carrier by eliminating any magnetic force from the carrier.

24. A method of transferring a magnetic article by a rotating carrier, comprising applying a stack of such articles to the carrier with a first one of the stack in full and firm engagement with the carrier for maximum magnetic attraction therebetween, rotating the carrier, applying a relatively weak magnetic force to the carrier and thereby moving said first article from the position at which it was applied to the carrier and thereby from the stack, thereafter increasing the magnetic force for holding the article on the carrier, and thereafter releasing the article from the carrier by eliminating any magnetic force from the carrier, and repeating the foregoing steps in relation to successive ones of the articles in the stack.

References Cited in the file of this patent

UNITED STATES PATENTS

| | | |
|---|---|---|
| 1,297,236 | Peiler | Mar. 11, 1919 |
| 1,814,891 | Bing | July 14, 1931 |
| 1,983,471 | Kramer | Dec. 4, 1934 |
| 2,365,691 | Fodor | Dec. 26, 1944 |
| 2,644,563 | Crary | July 7, 1953 |

FOREIGN PATENTS

| | | |
|---|---|---|
| 4,849 | Great Britain | Feb. 21, 1907 |